US008843919B1

(12) United States Patent  (10) Patent No.: US 8,843,919 B1
Weathersby et al.  (45) Date of Patent: *Sep. 23, 2014

(54) METHOD AND SYSTEM FOR RESTORING SOFTWARE

(75) Inventors: Richard D. Weathersby, New Braunfels, TX (US); Darren J. Black, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 333 days.

This patent is subject to a terminal disclaimer.

(21) Appl. No.: 12/951,694

(22) Filed: Nov. 22, 2010

Related U.S. Application Data

(63) Continuation of application No. 11/322,492, filed on Dec. 30, 2005, now Pat. No. 7,840,955.

(51) Int. Cl.
    *G06F 9/445* (2006.01)
(52) U.S. Cl.
    CPC ........................................ *G06F 8/64* (2013.01)
    USPC ................................ 717/174; 717/177
(58) Field of Classification Search
    CPC .............. G06F 8/60; G06F 8/63; G06F 8/64; G06F 8/65
    USPC .................................................. 717/101–178
    See application file for complete search history.

(56) References Cited

U.S. PATENT DOCUMENTS

| | | | |
|---|---|---|---|
| 5,583,983 A | 12/1996 | Schmitter | |
| 5,768,568 A | 6/1998 | Inui et al. | |
| 5,797,015 A | 8/1998 | Daniels, Jr. et al. | |
| 5,860,012 A * | 1/1999 | Luu | 717/175 |
| 5,870,611 A | 2/1999 | Shrader et al. | |
| 6,093,215 A | 7/2000 | Buxton et al. | |
| 6,138,153 A | 10/2000 | Collins et al. | |
| 6,151,643 A | 11/2000 | Cheng et al. | |
| 6,192,518 B1 | 2/2001 | Neal | |
| 6,195,794 B1 | 2/2001 | Buxton | |
| 6,490,722 B1 | 12/2002 | Barton et al. | |
| 6,499,137 B1 * | 12/2002 | Hunt | 717/164 |
| 6,578,199 B1 * | 6/2003 | Tsou et al. | 717/178 |
| 6,725,453 B1 | 4/2004 | Lucas et al. | |
| 6,865,737 B1 | 3/2005 | Lucas et al. | |
| 6,954,925 B1 | 10/2005 | Kong | |
| 6,968,551 B2 | 11/2005 | Hediger et al. | |
| 6,973,647 B2 | 12/2005 | Crudele et al. | |
| 7,093,259 B2 | 8/2006 | Pulsipher et al. | |
| 7,150,014 B2 | 12/2006 | Graupner et al. | |

(Continued)

OTHER PUBLICATIONS

Warped Image Restoration with Applications to Digital Libraries—Li Zhang, Chew Lim Tan—School of Computing, National University of Singapore—Proceedings of the 2005 Eight International Conference on Document Analysis and Recognition.*

(Continued)

*Primary Examiner* — Jason Mitchell
*Assistant Examiner* — Francisco Aponte
(74) *Attorney, Agent, or Firm* — Baker & Hostetler LLP (57) ABSTRACT

Method and system are disclosed for restoring multiple instances of a software application to a predetermined baseline state. The method/system of the invention creates a baseline template from a single correct or "golden" installation of the software application. The baseline template may then be deployed to restore previously used instances of the software application to a baseline state.

18 Claims, 6 Drawing Sheets

(56) References Cited

U.S. PATENT DOCUMENTS

| | | | |
|---|---|---|---|
| 7,577,951 B2 | 8/2009 | Partamian et al. | |
| 7,617,414 B2 | 11/2009 | Becker et al. | |
| 7,680,910 B2* | 3/2010 | Wallis et al. | 709/222 |
| 7,792,799 B2* | 9/2010 | Craswell et al. | 707/640 |
| 7,793,087 B2* | 9/2010 | Zenz et al. | 713/1 |
| 8,261,232 B2* | 9/2012 | Devarakonda et al. | 717/104 |
| 8,266,254 B2* | 9/2012 | Garrison et al. | 709/220 |
| 2002/0016955 A1 | 2/2002 | Matsuo | |
| 2002/0104069 A1 | 8/2002 | Gouge et al. | |
| 2002/0104080 A1* | 8/2002 | Woodard et al. | 717/176 |
| 2002/0188939 A1 | 12/2002 | Hediger et al. | |
| 2003/0088428 A1* | 5/2003 | Singhal | 705/1 |
| 2003/0182301 A1 | 9/2003 | Patterson et al. | |
| 2004/0015957 A1 | 1/2004 | Zara et al. | |
| 2004/0015959 A1 | 1/2004 | Kobayashi | |
| 2004/0044643 A1 | 3/2004 | deVries et al. | |
| 2004/0060045 A1 | 3/2004 | Hind et al. | |
| 2004/0148601 A1 | 7/2004 | Kroening | |
| 2004/0204949 A1* | 10/2004 | Shaji et al. | 705/1 |
| 2004/0268298 A1 | 12/2004 | Miller et al. | |
| 2005/0055667 A1 | 3/2005 | Beringer et al. | |
| 2005/0076325 A1* | 4/2005 | Bergin et al. | 717/100 |
| 2005/0120331 A1 | 6/2005 | Asare et al. | |
| 2005/0120344 A1 | 6/2005 | Asare et al. | |
| 2005/0120347 A1 | 6/2005 | Asare et al. | |
| 2005/0251786 A1 | 11/2005 | Citron et al. | |
| 2005/0262503 A1* | 11/2005 | Kane | 717/176 |
| 2006/0015839 A1 | 1/2006 | Owens et al. | |
| 2006/0048129 A1* | 3/2006 | Napier et al. | 717/168 |
| 2006/0101450 A1* | 5/2006 | Datta et al. | 717/168 |
| 2006/0195839 A1 | 8/2006 | Lin | |
| 2006/0206866 A1 | 9/2006 | Eldrige et al. | |
| 2006/0242626 A1 | 10/2006 | Pham et al. | |
| 2006/0245354 A1 | 11/2006 | Gao et al. | |
| 2007/0028229 A1 | 2/2007 | Knatcher | |
| 2007/0055972 A1 | 3/2007 | Brown et al. | |
| 2007/0157185 A1 | 7/2007 | Semerdzhiev et al. | |
| 2007/0162892 A1 | 7/2007 | Zenz et al. | |
| 2007/0214449 A1 | 9/2007 | Choi et al. | |
| 2007/0294321 A1 | 12/2007 | Midgley et al. | |
| 2008/0059950 A1 | 3/2008 | Seitz et al. | |
| 2008/0127169 A1* | 5/2008 | Malasky et al. | 717/174 |
| 2008/0134163 A1 | 6/2008 | Golde | |
| 2008/0155216 A1 | 6/2008 | Shoham | |
| 2008/0201705 A1 | 8/2008 | Wookey | |
| 2008/0256531 A1* | 10/2008 | Gao et al. | 717/177 |
| 2008/0288934 A1* | 11/2008 | Ozawa | 717/168 |
| 2009/0171705 A1 | 7/2009 | Bobak et al. | |
| 2010/0125841 A1* | 5/2010 | Bauer et al. | 717/174 |
| 2010/0179942 A1* | 7/2010 | Wallis et al. | 707/640 |

OTHER PUBLICATIONS

Alpern, et al. "PDS: A Virtual Execution Environment for Software Deployment," 2005, ACM, p. 175-185.

Hoek, A. "Configurable Software Architecture in Support of Configuration Management and Software Deployment," 1999, ACM, p. 732-733.

"Installing software through NAL" Xavier Information Systems & Services, viewed on Jun. 14, 2006 http://www.xu.edu/helpdesk/installing_software.htm.

"Integrating Pendragon Forms Distribution Toolbox with Pendragon SyncServer." Pendragon Software Corporation, viewed on Jun. 14, 2006 http://www.pendragon-software.com/forms3./toolboxesyncserver.html.

"WinINSTALL Software Distribution Suite (SDS)." OnDemand Software, viewed on Jun. 14, 2006 http://www.ondemandsoftware.com/sds.asp.

* cited by examiner

METHOD AND SYSTEM FOR RESTORING SOFTWARE

CROSS REFERENCE TO RELATED APPLICATIONS

This application is a continuation of U.S. patent application Ser. No. 11/322,492, filed on Dec. 30, 2005. This application is also related in subject matter to, and incorporates herein by reference in its entirety, each of the following: U.S. patent application Ser. No. 11/322,429, filed on Dec. 30, 2005, now U.S. Pat. No. 7,802,247, issued on Sep. 21, 2010; and U.S. patent application Ser. No. 11/322,786, filed on Dec. 30, 2005, now U.S. Pat. No. 7,831,968, issued on Nov. 9, 2010.

TECHNICAL FIELD

The disclosed embodiments relate generally to software applications and particularly to a method and system for restoring the software applications on multiple computing systems.

BACKGROUND

Advances in software programming and computing technology have made increasingly sophisticated and feature-rich software applications available to consumers and businesses alike. These powerful software applications provide a growing list of benefits in terms of improved accuracy, efficiency, and convenience for numerous tasks performed on a regular basis. Industry indicators predict that this trend is likely to continue and may even accelerate in the years ahead.

However, as software applications become more sophisticated, their installation and maintenance become correspondingly more difficult. E-commerce and online transaction-related software applications are particularly unwieldy in terms of size and complexity. Consequently, most companies retain a highly-trained technical support group or department dedicated to setting up and supporting various software applications used within their organizations. Users who need a software application may simply submit a request through the appropriate channels listing their specific requirements. The technical support department thereafter prepares the needed computing system (i.e., hardware and operating system), installs the requested software application, and presents the completed installation to the users.

An example of the procedure described above is illustrated in FIG. 1 via a system 100. A user 102 of the system 100 begins the procedure by submitting a request for a particular software application through designated channels to an organization's technical support department. Technical support personnel then obtain an appropriate computing system 104a, 104b, or 104c for installation of the requested software application, perform the installation, and test the installed software application to ensure proper operation. The installations are usually performed manually by inserting one or more portable media 106 (e.g., floppy disks or CD-ROMs) into an appropriate disk drive of the selected computing system 104a, 104b, or 104c, usually one disk at a time. After the installation is complete, the technical support personnel either physically deliver the computing system 104a, 104b, or 104c to the user or else make it available over a network connection (not expressly shown).

Figure 1:
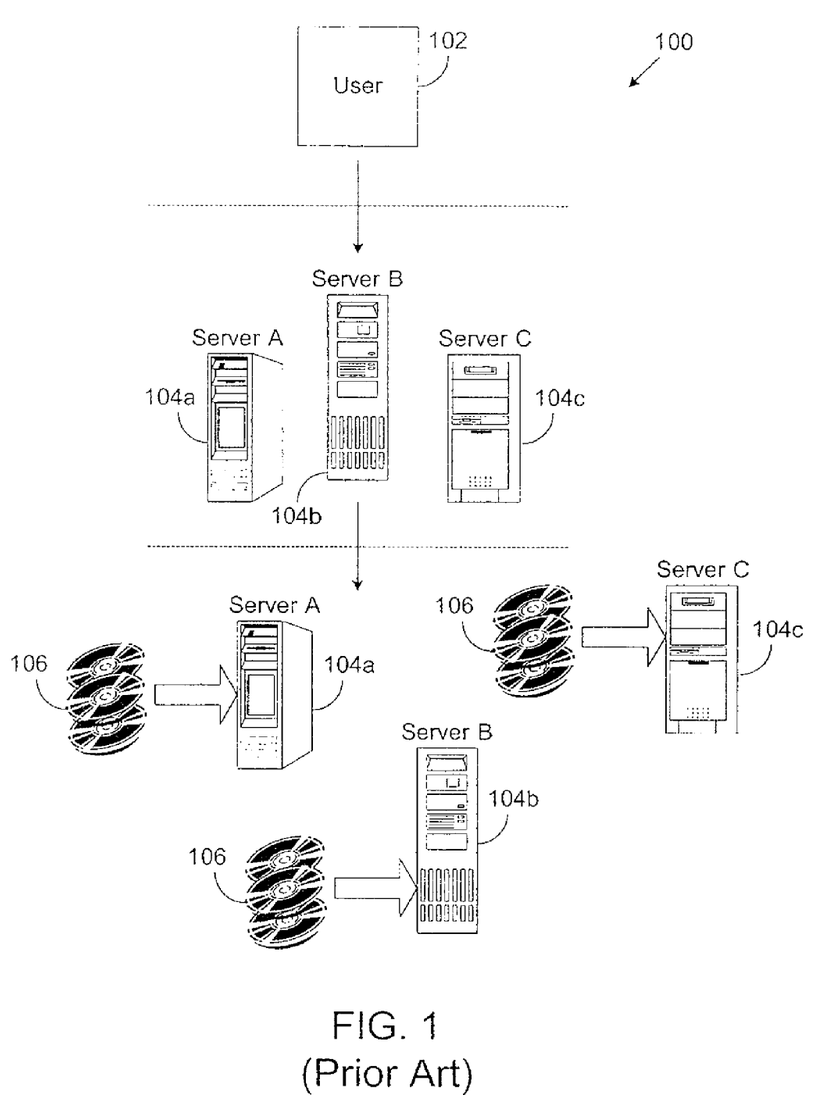
FIG. 1, described previously, illustrates a system for installing multiple instances of a software application according to the prior art.

A drawback of the above procedure is that every request for the software application must be installed from the beginning on each computing system 104a, 104b, and 104c via the portable media 106. Even for highly-trained technical support personnel, such a procedure is often fraught with potential problems and delays. For example, in addition to the lengthy installation time required, hardware and/or software incompatibilities may exist (e.g., a resource conflict between the operating system and the software application). Furthermore, the software application may require one or more patches or fixes, sometimes in a certain sequence or order, that can add to an already long installation time. Moreover, there may sometimes be human errors, such as clicking the wrong button, striking the wrong key, inserting the wrong disk, and so forth, that frequently lengthen the installation time even more. All of these problems are exacerbated when the software application is large, complex, and is required to be installed numerous times on multiple computing systems.

Accordingly, what is needed is a more efficient way to make a software application available on multiple computing systems without having to install the software application from the beginning via floppy disks, CD-ROMs, or other portable media for each computing system.

SUMMARY

The disclosed embodiments are directed to a method and system for providing multiple instances of a software application. The method/system of the invention creates a baseline template from a single correct or "golden" installation of the software application and uses the baseline template to restore previously used instances of the software application to a baseline state. In one embodiment, any references to a specific host or computing system in the configuration files or directories of the previously used instance of the software application are replaced with a temporary variable in the baseline template. The baseline template may then be stored on a designated server and uploaded to any computing system needing a baseline instance of the software application. Once uploaded, the variable is replaced with system-specific references to restore the baseline state. Since the software application is restored from the baseline template and not from floppy disks or CD-ROMs, the process takes significantly less time.

BRIEF DESCRIPTION OF THE DRAWINGS

The foregoing and other advantages will become apparent from the following detailed description and upon reference to the drawings, wherein.

DETAILED DESCRIPTION

Following is a detailed description of illustrative embodiments with reference to the drawings wherein the same reference labels are used for the same or similar elements. As used throughout this description and the claims, the terms "a" and "an" are intended to mean "one or more."

As mentioned above, existing procedures for installing multiple instances of a software application, particularly a large and complex software application, are inefficient and fraught with potential for problems and delays. Various embodiments provide a method and system for more efficiently installing software applications in cases where it may not be necessary to perform a complete installation of the software application.

Consider the case where one user has finished using the software application and has relinquished his/her computing system to another user. In such cases, it may be sufficient merely to restore the software application to a predetermined baseline state on the relinquished computing system rather than perform a new installation of the software application. The baseline state may be a "clean" or unused state, such as the state immediately after installation of the software application (i.e., before any users have used the software application), or it may be some predefined intermediate state (e.g., after one or more patches and fixes have been applied). Accordingly, the term "restore" is used herein to mean that the software application has been returned to some predetermined baseline state.

The method/system uses a correct or "golden" (i.e., error-free) installation of a software application to create a baseline template. The baseline template contains baseline versions of the files that are likely to be modified or deleted as the software application is used, along with the directory structure for these files. These likely-to-change files may be identified by monitoring the software application over a sufficiently long period of time or sufficiently high number of users. Such a baseline template may then be uploaded to any computing system requiring an instance of the software application and used to restore the software application to a baseline state. Since the baseline template is based on a correctly-installed instance of the software application, all subsequent restorations made from the baseline template are also correct. And, since the subsequent restorations are made from the baseline template and perhaps not portable media, such as floppy disks or CD-ROMs, the process takes significantly less time.

Figure 2:
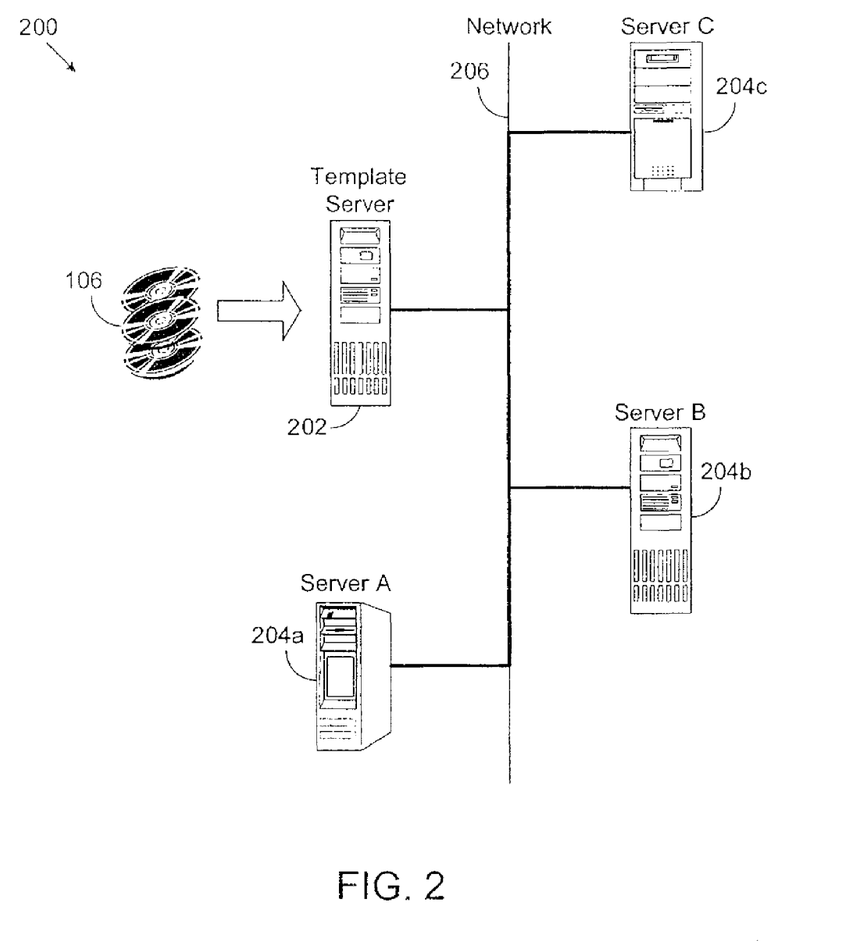
FIG. 2 illustrates a system for restoring multiple instances of a software application.

FIG. 2 illustrates a system 200 according to disclosed embodiments that may be used for restoring multiple installations of a software application. The system 200 includes a technical support computing system 202 (also referred to herein as a template server) connected to a number of user computing systems 204a, 204b, and 204c over a network 206. A software application is installed from either the portable media 106 or an application server (not expressly shown) onto the template server 202 (e.g., by a technical support or other appropriate personnel). The installed software application is subsequently used to create a baseline template from which restorations of the software application may be performed. The baseline template may then be transferred to each user computing system 204a, 204b, or 204c as needed over the network 206 to restore the software application. Such an arrangement allows baseline instances of the software application to be made available on the user computing systems 204a, 204b, and 204c without installing the entire software application.

Figure 3:
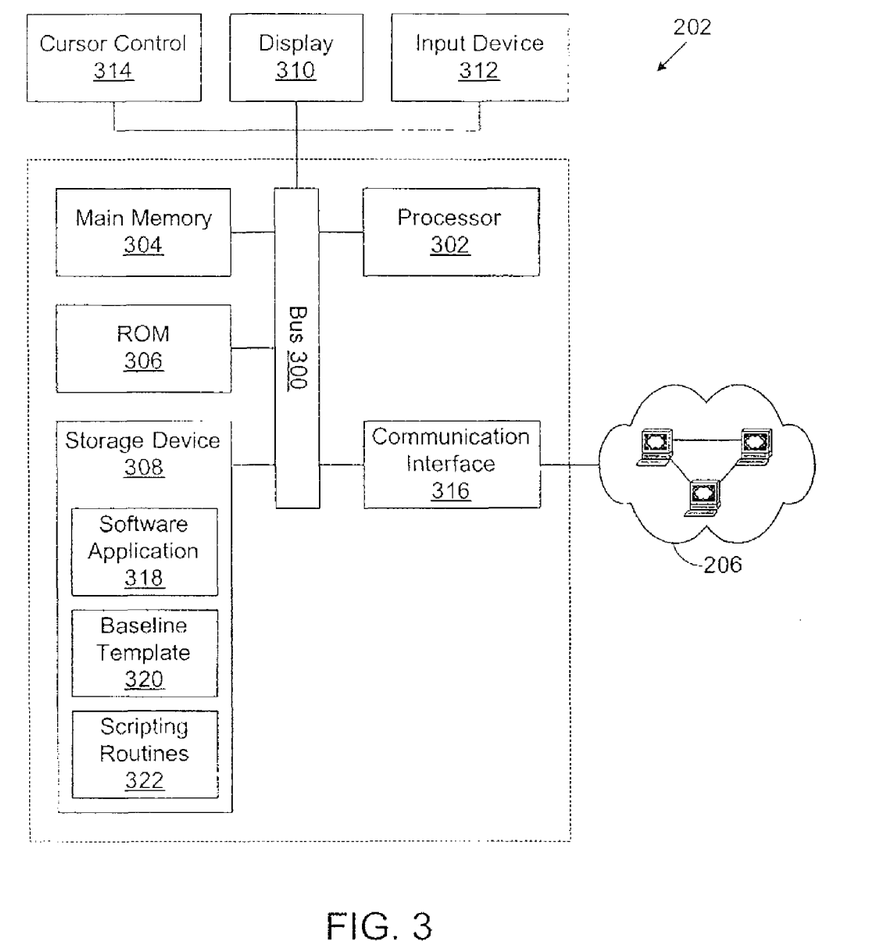
FIG. 3 illustrates a computing system for restoring multiple instances of a software application.

FIG. 3 illustrates the template server 202 in more detail. In the implementation shown, the template server 202 includes a bus 300 or other communication mechanism for communicating information and a processor 302 coupled with the bus 300 for processing information. The template server 202 also includes a main memory 304, such as a random access memory (RAM) or other dynamic storage device, coupled to the bus 300 for storing computer-readable instructions to be executed by the processor 302. The main memory 304 also may be used for storing temporary variables or other intermediate information during execution of the instructions to be executed by the processor 302. The template server 202 further includes a read-only memory (ROM) 306 or other static storage device coupled to the bus 300 for storing static information and instructions for the processor 302. A computer-readable storage device 308, such as a magnetic disk or optical disk, is coupled to the bus 300 for storing information and instructions for the processor 302.

The template server 202 may be coupled via the bus 300 to a display 310, such as a cathode ray tube (CRT), for displaying information to a user. An input device 312, including, for example, alphanumeric and other keys, is coupled to the bus 300 for communicating information and command selections to the processor 302. Another type of user input device is a cursor control 314, such as a mouse, a trackball, or cursor-direction keys for communicating direction information and command selections to the processor 302 and for controlling cursor movement on the display 310. The cursor control 314 typically has two degrees of freedom in two axes, a first axis (e.g., x) and a second axis (e.g., y), that allow the device to specify positions in a plane.

The term "computer-readable instructions" as used above refers to any instructions that may be performed by the processor 302 or other component. Similarly, the term "computer-readable medium" refers to any storage medium that may be used to store the computer-readable instructions. Such a medium may take many forms, including, but not limited to, non-volatile media, volatile media, and transmission media. Non-volatile media include, for example, optical or magnetic disks, such as the storage device 308. Volatile media include dynamic memory, such as main memory 304. Transmission media include coaxial cables, copper wire and fiber optics, including wires of the bus 300. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EPROM, any other memory chip or cartridge, a carrier wave, or any other medium from which a computer can read.

Various forms of the computer-readable media may be involved in carrying one or more sequences of one or more instructions to the processor 302 for execution. For example, the instructions may initially be borne on a magnetic disk of a remote computer. The remote computer can load the instructions into its dynamic memory and send the instructions over a telephone line using a modem. A modem local to the template server 202 can receive the data on the telephone line and use an infrared transmitter to convert the data to an infrared signal. An infrared detector coupled to the bus 300 can receive the data carried in the infrared signal and place the data on the bus 300. The bus 300 carries the data to the main memory 304, from which the processor 302 retrieves and executes the instructions. The instructions received by the main memory 304 may optionally be stored on the storage device 308 either before or after execution by the processor 302.

The template server 202 also includes a communication interface 316 coupled to the bus 300. The communication interface 316 provides a two-way data communication coupling between the template server 202 and the network 206.

For example, the communication interface 316 may be an integrated services digital network (ISDN) card or a modem used to provide a data communication connection to a corresponding type of telephone line. As another example, the communication interface 316 may be a local area network (LAN) card used to provide a data communication connection to a compatible LAN. Wireless links may also be implemented. In any such implementation, the communication interface 316 sends and receives electrical, electromagnetic, optical, or other signals that carry digital data streams representing various types of information.

A software application 318 may be installed on the template server 202, for example, on the storage device 308. The installed software application 318 may then be used to create a baseline template 320 from which subsequent restorations of the software application 318 may be made. The baseline template 320 may thereafter be transferred to each user computing system 204a, 204b, or 204c as needed over the network 206 to restore the software application 318. Such an arrangement allows baseline instances of the software application 318 to be provided on the user computing systems 204a, 204b, and 204c without perhaps necessarily installing the entire application from the portable media 106.

The installed software application 318 is preferably a correct or "golden" installation, meaning that it has been tested and observed to work properly and that at least some needed patches, fixes, modifications, and customizations have been applied. The use of a "golden" installation ensures that the baseline template 320 is correct (i.e., validated) and that restorations of the software application 318 based on the baseline template 320 are also correct. To this end, the installation of the software application 318 is preferably performed manually from the original portable media 106. Although this task is tedious and time-consuming, it need only be performed correctly once to create the baseline template 320. It is also possible to install the software application 318 from, for example, a set of installation files stored on an application server (not expressly shown). If necessary, a trial-and-error approach may be used and the installation repeated until the software application 318 is determined to be correctly installed (i.e., a "golden" installation).

In some cases, the installation of the software application 318 may produce one or more custom files and/or directories that are specific to the host computing system (i.e., the template server 202). Certain enterprise integration software applications, for example, WebSphere™ from International Business Machine (IBM) Corp., create directories that contain the name of the host computing system in the directories (e.g., "/WebSphere/AppServer/ . . . /ServerA/ . . . "). One or more files for these software applications, including the configuration files, may also contain references to the host computing system. An example of a WebSphere™ directory listing taken using a standard "dir" command is shown in Example 1, where some of the directories have been truncated for economy of the description.

/opt/WebSphere51/DeploymentManager/temp/testops1asjtManager
/opt/WebSphere51/DeploymentManager/logs/preload
/opt/WebSphere51/DeploymentManager/installedApps/testops1asjtNetwork
/opt/WebSphere51/DeploymentManager/config/temp/cells/testops1asjtNetwork/nodes/ . . .
/opt/WebSphere51/DeploymentManager/config/temp/cells/testops1asjtNetwork
/opt/WebSphere51/DeploymentManager/config/cells/testops1asjtNetwork/nodes/testops1asjt . . .
/opt/WebSphere51/DeploymentManager/config/cells/testops1asjtNetwork/opt/WebSphere51/ . . .
/opt/WebSphere51/DeploymentManager/bin/wsinstance/configdefaults/cells/testops1asjt . . .
/opt/WebSphere51/AppServer/logs/preload
/opt/WebSphere51/AppServer/installedApps/
/opt/WebSphere51/AppServer/config/temp/cells/testops1lsjtNetwork/nodes/testops1asjt
/opt/WebSphere51/AppServer/config/cells/testops1lsjtNetwork/nodes/testops1asjt
/opt/WebSphere51/AppServer/config/backup/base/cells/testops1asjt/nodes/testops1asjt
/opt/WebSphere51/AppServer/config/backup/base/cells/testops1asjt
/opt/webSphere51/AppServer/bin/wsinstance/configdefaults/cells/testops1asjt/nodes/ . . .
/opt/WebSphere51/AppServer/bin/wsinstance/configdefaults/cells/testops1asjt Example 1

As can be seen from the above example, a number of directories have names that contain a reference to a specific computing system, namely, "testops1asjt." Some or all of these directories may contain files that are likely to change with usage (e.g., the configuration files and the configuration directories). Therefore, for software applications such as WebSphere™, the installed software application 318 may be generalized before the baseline template 320 is created. This means that references to a specific computing system (e.g., the template server 202) may be temporarily replaced with a generic reference (e.g., "RICK") or variable (e.g., "X") before creating the baseline template 320. The generic reference or variable may then be replaced with the name of one of the user computing systems 204a, 204b, or 204c (e.g., Server A, Server B, Server C, etc.) when the baseline template 320 is used to restore the software application 318 on that user computing system.

The template server 202 may further include one or inure scripting routines 322 stored, for example, on the storage device 308, that are designed to remove specific references to the host computing system. The scripting routines 322 may reside on the template server 202 as shown in this example, or they may reside on some other computing system, then executed on the template server 202 over the network 206. When executed, the scripting routines 322 recursively search through the directory names of the likely-to-change files (e.g., the configuration directories) looking for any computing system-specific directory names. The scripting routines 322 also search the content of likely-to-change files (e.g., the configuration files) for computing system-specific references in the files. The scripting routines 322 thereafter may search the found references, if any, and replace them with a temporary generic reference or variable.

An example of a PERL language scripting routine 322 for compressing the configuration files and for searching and replacing computing system-specific references in the configuration files of the software application 318 in a UNIX-based operating system is shown in Example 2 below. The various commands and statements used in such a scripting routine are believed to be well understood by those having ordinary skill in the art and will therefore not be described in detail here. Other scripting routines for other operating systems (e.g., Solaris, Linux, Windows, DOS, etc.) running on the template server 202 may also be used. Although the compression and file name and directory name searches have been combined in Example 2, it is certainly possible to create separate scripting routines 322 for the compression and the file name and directory name searches. When searching and replacing directory names, the scripting routines 322 may proceed through the directory structure in reverse order (i.e., deepest sub-directories first). Otherwise, one or more child directories may not be accessible once the parent directory names have been changed.

```perl
#!/urs/bin/perl

################################################
This script makes the AfterFederation.zip    ###
template. It replaces instances of the       ###
current hostname with the variable "RICK"    ###
... (directories and files)                  ###
########################################## use File::Copy;
my $HOST = 'hostname';
chomp($HOST);
my $appFile = '/tmp/FILES.txt';
my $dirFile = '/tmp/DIRS.txt';
my $fileCounter=0;
my $dirCounter=0;
my $Variable = "RICK";
my @LIST = qw(DeploymentManager AppServer);
foreach $i ( @LIST ) {
if( -e $appFile && -e $dirFile ) {
    'mv $appFile /tmp/FILES.txt.$i';
    'mv $dirFile /tmp/DIRS.txt.$i';
}
# Locating all FILES and DIRECTORIES with
a hostname entry #########
my @files = 'find /opt/WebSphere51/$i/config/
-type f -exec grep -q \"$HOST\" { } \\\; -
print > $appFile 2>/dey/null';
my @dirs = 'find /opt/WebSphere51/$i/config/
-type d -name \"$HOST\+\" > $dirFile
2>/dev/null';
sleep(5);

#----------------------------------------------------------#
#---    Changing files: hostname to RICK      --#
----------------------------------------------------------# open(APPFILE, "$appFile");
@files=<APPFILE>;
close(APPFILE);
foreach $item ( @files ) {
    chomp($item);
    print "File" \t $item\n";
    $itemBackup = $item . ".BAK";
    print "\t\tCopying $item to $itemBackup . . .\n";
    move($item, $itemBackup) or die "Copy failed for $item: $!";
    print "\t\tReplacing $HOST with $Variable . . .\n";
    my $replace = 'sed -e 's/$HOST/$Variable/g' $itemBackup >> $item';
    $fileCounter++;
}
print "NUMBER OF FILES CHANGED: $fileCounter\n";

#----------------------------------------------------------#
#---   Changing directories: hostname to RICK   --#
----------------------------------------------------------# sub backwards {$b cmp $a};
open(DIRFILE, "$dirFile");
@dirs=<DIRFILE>;
close(DIRFILE);
my @SortedDirs = sort backwards(@dirs);
foreach $item ( @SortedDirs ) {
    chomp($item);
    if( $item =~ /$HOST/i ) {
        opendir(MD1, $item) || die("Can't open directory: $item\n");
        @theFiles=readdir(MD1);
        closedir(MD1);
```

-continued

```perl
        chdir($item);
        foreach $dir (@theFiles) {
            if( -d $dir ) {
                if( $dir =~ /$HOST/ ) {
                    my $original = $dir;
                    (my $new1 = $original) =~ s/$HOST/$Variable/;
                    print "New Directory: $new1\n";
                    print "Moving $original directory to $new1
directory . . . . .\n";
                    'mv $original $new1';
                }
            }
        }
    print "\n . . . . . . . .New Entry. . . . . . . . . . . . . . . .\n";
    print "Directory: \t $item\n";
    $length = length($item);
    $sub = rindex($item, $HOST);
        $substring = substr($item, 0, $sub);
        @DirArray = split(/\//, $item);
        my $lastElement = $DirArray[-1];
        chomp($lastElement);
        if ( $lastElement =~ /$HOST/ ) {
            ($replace = $lastElement) =~ s/$HOST/$Variable/;
            $substring .= $replace;
        }
    print "Final Substring: . . . . . $substring\n";
    my $orig = $item;
    my $new = $substring;
    print "New Directory: $new\n";
    print "Moving $orig directory to $new directory . . . . .\n";
    'mv $orig $new';
    $dirCounter++;
    } else {
        if( -e $item ) {
            opendir(MD, $item) || die("Can't open directory: $item\n");
            @thefiles=readdir(MD);
            closedir(mD);
            chdir($item);
            foreach $directory (@thefiles) {
                if( -d $directory ) {
                    if( $directory =~ /$HOST/ ) {
                        my $orig2 = $directory;
                        (my $new2 = $orig2) =~ s/$HOST/$Variable/;
                        print "New Directory: $new2\n";
                        print "Moving $orig2 directory to $new2 directory
. . . . .\n";
                        'mv $orig2 $new2';
                        $dirCounter++;
                    }
                }
            }
        }
    }
}
print "NUMBER OF DIRECTORIES CHANGED: $dirCounter\n";
}

#----------------------------------------------------------#
#---- Removing /wstemp & /config/temp dirs ------#
#----------------------------------------------------------#
```

After the software application 318 has been generalized, it may be used to create the baseline template 320. To create the baseline template 320, an archive or backup is made of the configuration files or other likely-to-change files along with the directory structure therefor. The archive or backup may be compressed in some cases, or it may simply be backed up without any compression. The compression may be performed using any suitable compression format (e.g., .ZIP, .TAR, .RAR, etc.), provided that the directory structure for the compressed files is maintained.

In some cases, the baseline template 320 may include more than one archive or backup files. For example, the archive or backup files may be organized according to their functions in the software application 318 or some other logical grouping, such as application server configuration files or other likelyto-change files and directories in one baseline template file, deployment manager configuration files and directories in another baseline template file, and so forth. Note that only the configuration files or other likely-to-change files of the software application 318 are used for the baseline template 320 and perhaps not all of the installed files (i.e., the baseline template 320 may not be an installation template).

After the baseline template 320 is created, it may be uploaded to any user computing system 204a, 204b, or 204c requiring a baseline instance of the software application 318. The upload may be conducted by a direct file transfer from the template server 202 to a user computing system 204a, 204b, or 204c, or it may be conducted over the network 206. The latter case allows any user computing system 204a, 204b, or 204c connected to the network 206 to receive a copy of the baseline template 320 regardless of the physical location of the template server 202. Such an arrangement results in a much more efficient and convenient procedure than having to install the software application 318 on each computing system.

Once uploaded, the baseline template 320 may be decompressed, unpacked, expanded, or otherwise processed to retrieve the configuration files and directories for the software application 318 onto the new user computing system 204a, 204b, or 204c, and the generic reference or variable may be replaced with the name of the new user computing system. In some embodiments, the scripting routines 322 mentioned earlier may be used to perform the decompression/unpacking of the baseline template 320 and insert the name of the new user computing system 204a, 204b, or 204c. An example of a PERL language scripting routine 322 that may be used to insert the name of the new user computing system 204a, 204b, or 204c in the newly installed configuration files and directories of the software application 318 in a UNIX-based operating system is shown in Example 3 below. Other scripting routines may be used for other operating systems (e.g., Solaris, Linux, Windows, DOS, etc.) by those having ordinary skill in the art. Those having ordinary skill in the art will recognize that the caution regarding reverse sorting of the directory listing mentioned with respect to Example 2 applies here as well.

```
#!/usr/bin/perl

##############################################
This script makes the AfterFederation.zip   ###
template and replaces all the variable      ###
"RICK" instances with the current hostname  ###
of the node .... (directories and files)    ###
######################################## use File::Copy;
my $HOST = 'hostname';
chomp($HOST);
my $appFile = '/tmp/FILES2.txt';
my $dirFile = '/tmp/DIRS2.txt';
my $fileCounter=0;
my $dirCounter=0;
my $Variable = "RICK";
my $date = 'date';
chomp($date);
print "$date\n";
my @LIST = qw(DeploymentManager AppServer);
foreach $i ( @LIST ) {
if( -e $appFile && -e $dirFile ) {
    'mv $appFile /tmp/FILES.txt.$i';
    'mv $dirFile /tmp/DIRS.txt.$i';
}
```

-continued

```
    my @files = 'find /opt/WebSphere51/$i/config/
    -type f -exec grep -q \"$Variable\" { } \\\;
    -print > $appFile 2>/dev/null';
    my @dirs = 'find /opt/WebSphere51/$i/config/
    -type d -name \"$Variable\*\" > $dirFile
    2>/dev/null';
    sleep(5);

#----------------------------------------------------#
#---  Changing files: RICK to hostname         --#
----------------------------------------------------# open(APPFILE, "$appFile");
@files=<APPFILE>;
close(APPFILE);
foreach $item ( @files ) {
    chomp($item);
    print "File: \t $item\n";
    $itemBackup = $item . ".BAK";
    print "\t\tCopying $item to $itemBackup ...\n";
    move($item, $itemBackup) or die "Copy failed for $item: $!";
    print "\t\tReplacing $Variable with $HOST ...\n";
    my $replace = 'sed -e 's/$Variable/$HOST/g' $itemBackup >> $item';
    $fileCounter++;
    unlink($itemBackup);
}
print "NUMBER OF FILES CHANGED: $fileCounter\n";

#----------------------------------------------------#
#---  Changing directories: RICK to hostname   --#
----------------------------------------------------# sub backwards {$b cmp $a};
open(DIRFILE, "$dirFile");
@dirs=<DIRFILE>;
close(DIRFILE);
my @SortedDirs = sort backwards(@dirs);
$item = undef;
foreach $item ( @SortedDirs ) {
    chomp($item);
    if( $item =~ /$Variable/i ) {
        opendir(MD1, $item) || die("Can't open directory: $item\n");
        @theFiles=readdir(MD1);
        closedir(MD1);
        chdir($item);
        foreach $dir (@theFiles) {
            if( -d $dir ) {
                if( $dir =~ /$Variable/ ) {
                    my $original = $dir;
                    (my $new1 = $original) =~ s/$Variable/$HOST/;
                    print "New Directory: $new1\n";
                    print "Moving $original directory to $new1
directory .....\n";
                    'mv $original $new1';
                }
            }
        }
        print "\n........New Entry................\n";
        print "Directory: \t $item\n";
        $length = length($item);
        $sub = rindex($item, $Variable);
        $substring = substr($item, 0, $sub);
        @DirArray = split(/\//, $item);
        my $lastElement = $DirArray[-1];
        chomp($lastElement);
        if ( $lastElement =~ /$Variable/ ) {
            ($replace = $lastElement) =~ s/$Variable/$HOST/;
            $substring .= $replace;
        }
        print "Final Substring: ..... $substring\n";
        my $orig = $item;
        my $new = $substring;
        print "New Directory: $new\n";
        print "Moving $orig directory to $new directory .....\n";
        'mv $orig $new';
        $dirCounter++;
    } else {
```

-continued

```
if( -e $item ) {
    opendir(MD, $item) || die("Can't open directory: $item\n");
    @thefiles=readdir(MD);
    closedir(MD);
    chdir($item);
    foreach $directory (@thefiles) {
        if( -d $directory ) {
            if( $directory =~ /$Variable/ ) {
                my $orig2 = $directory;
                (my $new2 = $orig2) =~ s/$Variable/$HOST/;
                print "New Directory: $new2\n";
                print "Moving $orig2 directory to $new2 directory
.....\n";
                'mv $orig2 $new2';
                $dirCounter++;
            }
        }
    }
}
print "NUMBER OF DIRECTORIES CHANGED: $dirCoonter\n";
print "$date\n";
}

#------------------------------------------------------------#
#---- Removing /wstemp & /config/temp dirs  -----#
#------------------------------------------------------------#
```

Thus far, the discussion has centered around creation of the baseline template 320 on the template server 202. From there, the baseline template 320 may be uploaded to a selected computing system and decompressed/unpacked to complete restoration of the software application 318 to a baseline state. A technical support person usually performs the various tasks described (e.g., uploading, restoring, inserting computing system-specific references, etc.). In some embodiments, however, the technical support person may automate the various tasks by providing the baseline template 320 to a restoration tool along with the required scripting routines 322. The restoration tool thereafter performs the uploading, restoring, insertion of computing system-specific references, and other related tasks as needed (e.g., in real time) or according to some predetermined schedule set by the technical support person.

Figure 4:
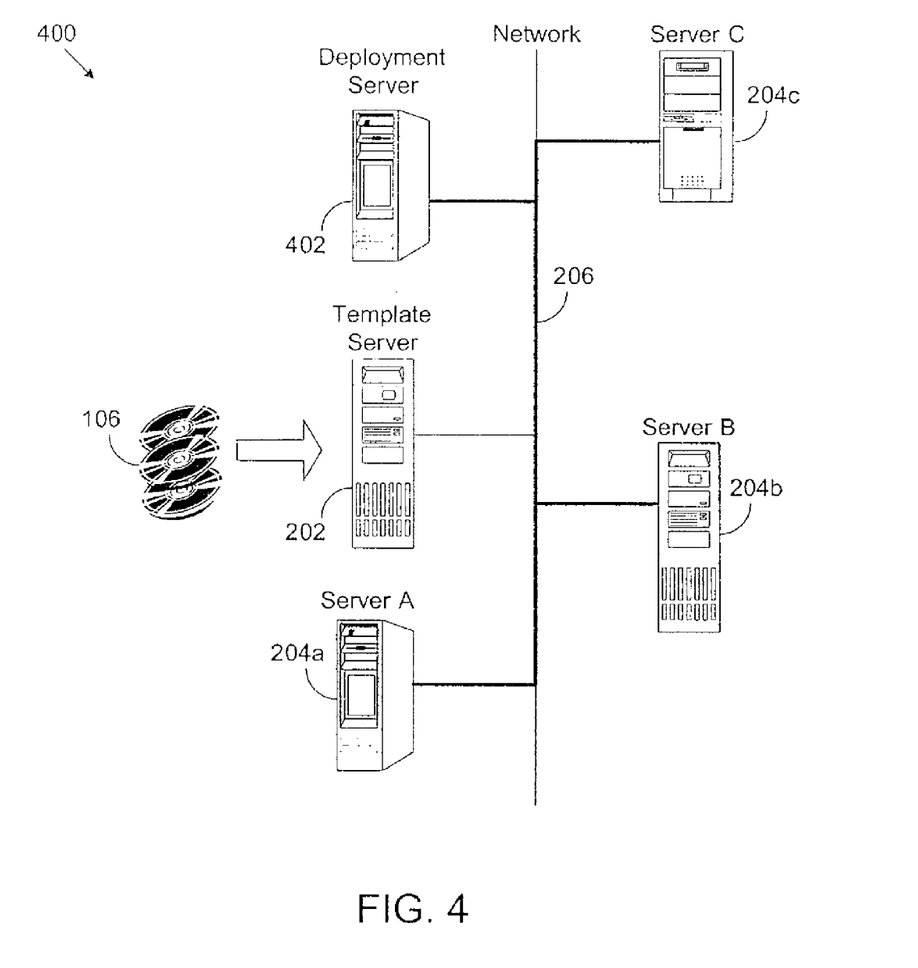
FIG. 4 illustrates another system for restoring multiple instances of a software application.

FIG. 4 illustrates a system 400 according to disclosed embodiments in which a restoration tool may be used for automatically restoring multiple instances of a software application to a baseline state. The system 400 is similar to the system 200 of FIG. 2 except that a deployment server 402 has been connected to the network 206. The deployment server 402 is likewise similar to the template server 202 except that the computer-readable storage device of the deployment server 402 contains, among other things, a restoration tool therein. Once the baseline template 320 has been created on the template server 202, the technical support person may deposit or otherwise transfer the baseline template 320 along with any required scripting routines 322 to the deployment server 402. The restoration tool on the deployment server 402 thereafter performs the various restoration related tasks as needed or according to some predetermined schedule set by the technical support person.

Figure 5:
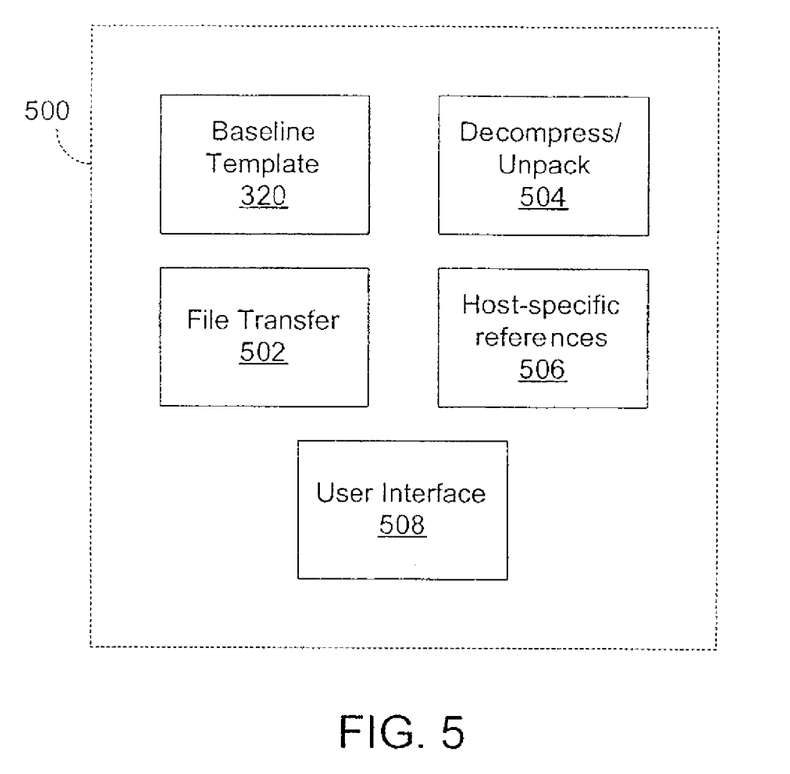
FIG. 5 illustrates a restoration tool for restoring multiple instances of a software application.

FIG. 5 illustrates the restoration tool of the deployment server 402 in more detail. As can be seen, a restoration tool 500 includes or has access to a number of components needed for restoring multiple instances of the software application 318 to a baseline state. For example, the restoration tool 500 includes or has access to the baseline template 320, a file transfer function 502 for uploading the baseline template 320 to a desired user computing system 204a, 204b, or 204c, a decompression/unpacking function 504 for expanding the baseline template 320, and a host or system-specific referencing function 506 for inserting computing system-specific references into the software application 318. Other components that may be present include a user interface 508 for allowing the technical support person to interact with the restoration tool 500. The restoration tool 500 may also include the capability of moving/transferring files from one computing system to another, versioning the files, executing/launching one or more executable routines or programs, and so forth.

Such a restoration tool as described above, when used in conjunction with a code repository, allows technical support personnel or other users to specify, for example, which baseline template 320 (assuming multiple versions of the baseline template) to use for the restoration and which scripting routine 322 to execute for the restoration. An example of a code repository that may be used with the deployment tool 500 for storing code is StarTeam™ from Borland Corp. of Cupertino, Calif. An example of a PERL language scripting routine 322 that may be used with the OPS deployment tool for restoring the software application 318 to a baseline state is shown in Example 4 below. Other scripting routines written for other operating systems may certainly be used without departing from principles of the invention.

```
#!/usr/bin/perl
#DirectiveReplaced - #!//usr/bin/perl
use File::Copy;

#----------------------------------------------#
#--- Extract Template Tar Directory -----#
----------------------------------------------# print "EXTRACTING TEMPLATE TAR DIRECTORY ....\n";
my $TAR = "/www/was50/FederationZip51/lib/FederationTemplate_51.tar";
        if(-e STAR) {
                my $extract = "tar -xvf $TAR";
                my $curdir = system("pwd");
                print "Current dir is $curdir \n";
                print "Setting current dir to /www/wtsutil/bin \n";
                chdir("/www/wtsutil/bin");
                my $curdir = system("pwd");
                print "Current dir is now $curdir \n";
                system($extract);
                print "Calling Restore Routine ....\n";
                Restore( );
        ) else {
```

```perl
                print " NO FILE PRESENT .....!!!!\n";
                exit(1);
        }
sub Restore {

#------------------------------------------#
#----------- Static Vars ------------------#
------------------------------------------# my $FederationDir = "/www/wtsutil/bin/FederationTemplate/";
my $WASTEMPLATE = $FederationDir . "BackupConfigs/was.Template.BackupConfig.zip";
my $WDMTEMPLATE = $FederationDir . "BackupConfigs/wdm.Template.BackupConfig.zip";
my $SCRIPT = $FederationDir . "scripts/AfterFederation_RestoreHostname:p1";
my $WASCONFDIR = "/opt/WebSphere51/AppServer/config";
my $WDMCONFDIR = "/opt/WebSphere51/DeploymentManager/config";
print "STARTING CONFIG RESTORE ...\n";

#--------------------------------------------------#
#--- Stopping all WebSphere Processes ----#
#--------------------------------------------------#

$procName = "java";
$OsType=`uname`;
chomp($OsType);
print "Operating System: ( $OsType ) ---------------- \n";
my $killCMD;
if ( $OsType =~ /Linux/ ){
        $killCMD = "ps -auxww | grep -v grep | grep -v deploynode | prep -i $procName | awk '{ print \$2 }' | xargs kill -9";
}
if ( $OsType =~ /SunOS/ ){
        $killCMD = "/usr/ucb/ps -auxww | grep -v grep | grep -v deploynode | grep -i $procName | awk '{ print \$2 }' | xargs kill -9";
}
if ( $OsType =~ /AIX/ ){
        $killCMD = "ps -ef | grep $procName | grep -v grep | grep -v deploynode | awk '{ print \$2 }' | xargs kill -9";
}
print "\tKilling all WebSphere(xx) Processes ...\n";
print "Kill Command: ( $killCMD ) \n";
system($killCMD);

#--------------------------------------------------#
#--- Removing config directories   --------#
#----         contents .........           --------#
#--------------------------------------------------#

--- WAS Configs ---# if (!(-e $WASCONFDIR)) {
                print ("Was config dir $WASCONFDIR is empty - creating ... \n");
                if (!mkdir($WASCONFDIR, 0755)) {
                        print "Error creating directory $WASCONFDIR = $! \n";
                }
        }
        my $returnValuewas = chdir($WASCONFDIR) or die("Cannot change to $_ directory
...\n");
        print "RETURNVALUE WAS = $returnValuewas\n";
        if($returnValuewas eq 1){
                print "\tRemoving WAS Config files ...\n";
                my $wasResult = "rm -Rf *";
                system($wasResult);
                print "\tPlacing Templated WAS Config files ...\n";
                my $WASPLATE = "jar -xvf $WASTEMPLATE";
                system($WASPLATE);
                print "Cleaning up BACKUP FILES ...\n";
                my $cleanupWAS = "find \. \-type f \-name \"*\.BAK\" \-print\|xargs rm";
                system($cleanupWAS);
        }

--- WDM Configs -----# if (!(-e $WDMCONFDIR)) {
                print ("Was config dir $WDMCONFDIR is empty - creating ... \n");
                if (!mkdir($WDMCONFDIR, 0755)) {
                        print "Error creating directory $WASCONFDIR = $! \n";
                }
```

```
                }
        my $returnValuewdm = chdir($WDMCONFDIR) or die("Cannot change to $_ directory
...\n");
        print "RETURNVALUE WDM = $returnValuewdm\n";
        if($returnValuewdm eq 1){
                print "\tRemoving WDM Config files ...\n";
                   my $wdmResult = `rm -Rf *`;
                print "\tPlacing Templated WDM Config files ...\n";
                my $WDMPLATE = "jar -xvf $WDMTEMPLATE";
                system($WDMPLATE);
                print "Cleaning up BACKUP FILES ...\n";
                my $cleanupWDM = "find \. \-type f \-name \"*\.BAK\" \-print|xargs rm";
                system($cleanupWDM);
        }

#--------------------------------------------------#
#--- Running Search & Replace Script ----#
#--------------------------------------------------#

$scriptResult = "perl $SCRIPT";
        print "\tRestoring Hostname to WAS & WDM Config Files ...\n";
        system($scriptResult);
        print "FINAL CLEANUP OF BACKUP FILES \n";
        print "WAS FILE CLEANUP .....\n";
        my $wAsClean = "find /opt/WebSphere51/AppServer/config/ \-type f \-name \"*\.BAK\"
\-print|xargs rm";
        system($wAsClean);
        print "WDM FILE CLEANUP .....\n";
        my $wDmClean = "find /opt/WebSphere51/DeploymentManager/config/ \-type f \-name
\"*\.BAK\" \-print|xargs rm";
        system($wDmClean);
}
my $host = `hostname`;
chomp($host);
print "\nHostname: $host\n";
my $network = $host . "Network";
print "Network: $network\n";
my $wdmsecFile = "/opt/WebSphere51/DeploymentManager/config/cells/$network/security.xml";
my $wassecFile = "/opt/WebSphere51/AppServer/config/cells/$network/security.xml";
my @Files = ("$wdmsecFile", "$wassecFile");
my $oldPword;
my $oldId;
my $pword;
my $id;
my         $copy1        =        `cp        $wdmsecFile
/opt/WebSphere51/DeploymentManager/config/cells/$network/security.xml.preFederation`;
my         $copy2        =        `cp        $wassecFile
/opt/WebSphere51/AppServer/config/cells/$network/security.xml.preFederation`;

#-----------------------------------------#
#-- Retrieve old values from  -----#
#-- security.xml files....    -----#
-----------------------------------------# foreach $secFile (@Files){
        If ( -e $secFile ){
                print "\nProcessing $secFile ....\n";
                open(APFILE, "$secFile");
                @files=<APFILE>;
                close(APFILE);
                foreach $item ( @files ) {
                        if(       $item        =~        /serverId\=\"(\w+)\"
serverPassword\=\"(\(xor\)\w+)\"/ }{
                                $oldId = $1;
                                $oldPword = $2;
                                #chomp($oldId);
                                #chomp($oldPword);
                        }
                }
        print "OLD WAS ACCOUNT\n";
        print "Old Id is: $oldId\n";
        print "Old PWord is : $oldPword\n";

#-------------------------------------#
#--- set was account values ------#
-------------------------------------# print "Host: $host\n";
```

```
            if( $host =~ /prod/i ){
                    $id = "PRODWASSVC";
                    $pword = "\{xor\}bW9qKD4s";
            } elsif ( $host =~ /test/i ){
                    $id = "TESTWASSVC";
                    $pword = "\{xor\}bW9rKD4s";
            ) elsif ( $host=~ /dev/i ){
                    $id = "DEVWASSVC";
                    $pword = "\{xor\}bW9sKD4s";
            }
            print "\nNEW WAS ACCOUNT\n";
            print "ID: $id\n";
            print "PWORD: $pword\n";
            my @oldArray = ("$oldId", "$oldPword");
            my @newArray = ("$id", "$pword");
            my $k=0;

#----------------------------------------#
#-- Change values in security.xml  --#
----------------------------------------# while( $k < 2 ){
                        print "File: \t $secFile\n";
                        $secFileBackup = $secFile . ".BAK";
                        print "\t\tCopying $secFile to $secFileBackup ...\n";
                        move($secFile, $secFileBackup) or die "Copy failed for $secFile: $!";
                        print "\t\tReplacing $oldArray[$k] with $newArray[$k] ...\n";
                        my $replace = `sed -e 's/$oldArray[$k]/$newArray[$k]/g' $secFileBackup >>
$secFile`;
                        $k++;
                        my $perms = `chmod 744 $secFileBackup`;
                        unlink($secFileBackup);
                    }
                    $k=0;
            } else {
                    print "$secFile does not exist !!!!!";
            }
}

#----------------------------------------#
#--  Linking SOAP & SAS Files  -----#
----------------------------------------# print "Host: $host\n";
            if( $host =~ /prod/i ){
                        print "\n --------- Setting SOAP and SAS file to PROD -------\n\n\n";
                        `ln         -fs        /www/was50/config/soapconfig/soap.client-PROD.props.wdm
/opt/WebSphere51/DeploymentManager/properties/soap.client.props`;
                        `ln         -fs        /www/was50/config/soapconfig/soap.client-PROD.props.was
/opt/WebSphere51/AppServer/properties/soap.client.props`;
                        `ln         -fs        /www/was50/config/sasconfig/sas.client-PROD.props.wdm
/opt/WebSphere51/DeploymentManager/properties/sas .client props`;
                        `ln         -fs        /www/was50/config/sasconfig/sas.client-PROD.props.was
/opt/WebSphere51/AppServer/properties/sas.client.props`;
            } elsif ( $host =~ /test/i ){
                        print "\n--------- Setting SOAP and SAS file to TEST -------\n\n\n";
                        `ln         -fs        /www/was50/config/soapconfig/soap.client-TEST.props.wdm
/opt/WebSphere51/DeploymentManager/properties/soap. client. props`;
                        `ln         -fs        /www/was50/config/soapconfig/soap.client-TEST.props.was
/opt/WebSphere51/AppServer/properties/soap.client.props`;
                        `ln         -fs        /www/was50/config/sasconfig/sas.client-TEST.props.wdm
/opt/WebSphere51/DeploymentManager/properties/sas.client.props`;
                        `ln         -fs        /www/was50/config/sasconfig/sas.client-TEST.props.was
/opt/WebSphere51/AppServer/properties/sas.client.props`;
            } elsif ( $host =~ /dev/i ){
                        print "\n--------- Setting SOAP and SAS file to DEV -------\n\n\n";
                        `ln         -fs        /www/was50/config/soapconfig/soap.client-DEV.props.wdm
/opt/WebSphere51/DeploymentManager/properties/soap.client.props`;
                        `ln         -fs        /www/was50/config/soapconfig/soap.client-DEV.props.was
/opt/WebSphere51/AppServer/properties/soap.client.props`;
                        `ln         -fs        /www/was50/config/sasconfig/sas.client-DEV.props.wdm
/opt/WebSphere51/DeploymentManager/properties/sas.client:props`;
                        `ln         -fs        /www/was50/config/sasconfig/sas.client-DEV.props.was
/opt/WebSphere51/AppServer/properties/sas.client.props`;
            }
```

```
#-------------------------------------#
#-- Setting up setupCmdLine.sh ----#
-------------------------------------# my $oldname;
my $cmdLineFile = "/opt/WebSphere51/AppServer/bin/setupCmdLine.sh";
my          $copy3          =          `cp          $cmdLineFile
/opt/WebSphere51/AppServer/bin/setupCmdLine.sh.afterFederation`;
print "Setting up setupCmdLine.sh file .....\n";
print "Host: $host\n";
open(APFILE, "$cmdLineFile");
@les=<APFILE>;
close(APFILE);
    foreach $it ( @les ) {
        if( $it =~ /WAS_CELL\=(\w+)Network/ ){
            $oldname = $1;
            #chomp($name);
        }
    }
        print "OldName: $oldname\n";
        print "File: \t $cmdLineFile\n";
        $cmdLineBackup = $cmdLineFile . ".BAK";
        print "\t\tCopying $cmdLineFile to $cmdLineBackup ...\n";
        move($cmdLineFile, $cmdLineBackup) or die "Copy failed for $cmdLineFile: $!";
        print "\t\tReplacing $oldname with $host ...\n";
        my $replace = `sed -e 's/$oldname/$host/g' $cmdLineBackup >> $cmdLineFile`;
    my $permision = `chmod 744 $cmdLineFile`;
        unlink($cmdLineBackup);

#----------------------------------------------#
#---- Cleaning up FederationTemplate Dir --#
----------------------------------------------# if ( -d "/www/wtsutil/bin/FederationTemplate" ){
            system "rm -rf /www/wtsutil/bin/FederationTemplate";
        }
    if ( -d "/www/was50/FederationZip51" ){
            system "rm -rf /www/was50/FederationZip51";
        }

#################################################
### END OF SCRIPT ####################
#################################################
```

In operation, the technical support person select the particular user computing system 204a, 204b, or 204c on which to install the software application 318 through the user interface 508. In some embodiments, the technical support person also specifies when the restoration is to take place. The restoration tool 500 thereafter may automatically perform the restoration in the manner described above at the appropriate date and time. The date and time of the installation may be in real time or it may be according to some predetermined schedule, or it may occur based on some other condition or criteria. Once the restoration is complete, the software application 318 is ready to be used on the new user computing system 204a, 204b, or 204c in significantly less time compared to a full installation of the software application 318.

Figure 6:
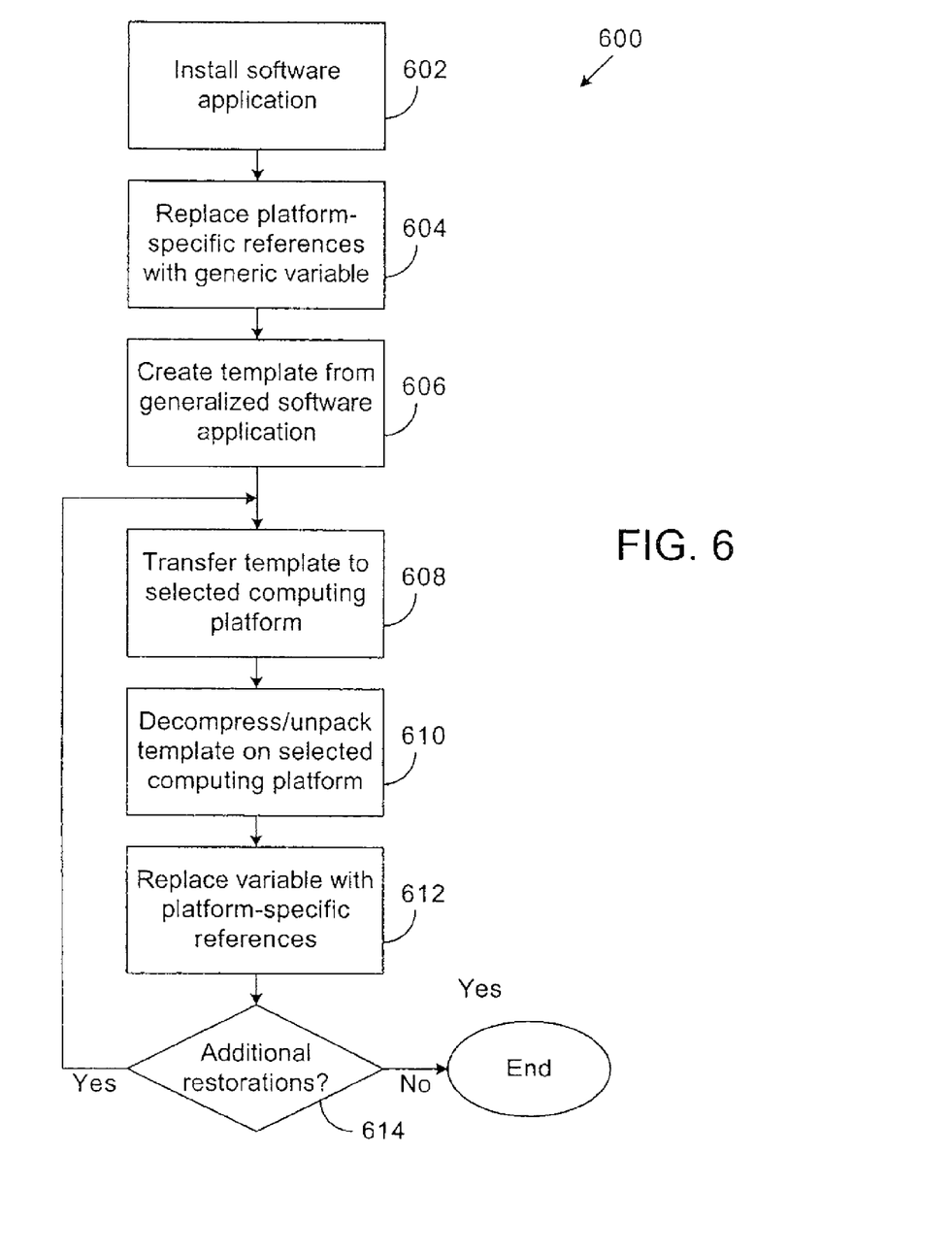
FIG. 6 illustrates a method for restoring multiple instances of a software application.

FIG. 6 illustrates a method 600 that may be used to restore a software application to a baseline state. The method 600 begins at step 602, where an installation of the software application is performed. Preferably (but not necessarily), this installation is accomplished using the original floppy disks or CD-ROMs in order to ensure a correct installation. Any patches, fixes, modifications, or customizations that may be needed are also applied to the software application at this time. Once a correct installation of the software application has been completed, computing system-specific references in the configuration files or other likely-to-change files, directories, and sub-directories of the installed software application may be replaced with a generic reference or variable at step 604. At step 606, a baseline template is created from the installed software application from the configuration files, directories, and sub-directories. In various embodiments, the baseline template may be one or more compressed files containing the configuration files in the software application and their directory structures. In other various embodiments, the baseline template is simply a backup or archive of the configuration files of the software application and their directory structure.

At step 608, the baseline template is uploaded to a selected user computing system. The upload may occur over a network or it may be performed from one computing system (e.g., the template server 202) directly to another computing system. At step 610, the baseline template is decompressed/unpacked on the selected computing system to retrieve the configuration files, directories, and sub-directories of the software application. Generic references or variables are then replaced with the name of the selected user computing system at step 612 to complete the restoration of the software application to a baseline state. Note that this step may be done either manually by technical support personnel or through the use of an automated restoration tool such as the OPS deployment tool. At step 614, a determination may be made as to whether additional restorations of the software application are needed. If the answer is yes, the method 600 returns to step 608 and the restoration is repeated for the next computing system. If the answer is no, the method 600 is concluded.

The foregoing embodiments of the invention have been described with respect to the restoration of a complex software application across an organization's local or private network. However, the disclosed embodiments are not limited thereto and may be used to restore any software application across any network, including the Internet. In the latter case, the baseline template may be stored on a web server and made available through a web site hosted by the web server. The baseline template may then be downloaded and used to restore a software application as needed. The download may occur free of charge (e.g., freeware, shareware), or as part of an online purchase or other e-commerce transaction (preferably with the appropriate security mechanisms in place). Such an arrangement is useful where the software application that needs to be restored is particularly large and downloading the entire software application over the network would take a long time. In some embodiments, the provider of the baseline template may be a technical support provider for the software application and the receiver of the baseline template may be a purchaser of the software application.

Any compression algorithms, scripting routines (e.g., for handling computing system-specific references), or other software tools may be transferred along with the baseline template to the selected computing system. Alternatively, instead of several separate software tools, all required software tools may be bundled together in a single executable program (e.g., a "restore" file) written and compiled in an appropriate programming language (e.g., Java, Flash, Html, Xml, C++, etc.) and subsequently transferred to and executed on the selected computing system. In some embodiments, the executable program containing the software tools may be combined with the baseline template as a single file. In any event, the above arrangement allows businesses and consumers alike to benefit from the highly efficient restoration system and method.

While the disclosed embodiments have been described with reference to one or more particular examples, those skilled in the art will recognize that many changes may be made thereto without departing from the spirit and scope of the inventions. Therefore, each of the foregoing embodiments and obvious variations thereof is contemplated as falling within the spirit and scope of the claimed inventions, which is set forth in the following claims.

What is claimed is:

1. A computer-implemented method, comprising:
monitoring a software application utilized by a plurality of users to identify a specific reference including a name of a host computing system;
installing the software application on a host computing system, wherein the installation produces a file having the specific reference that is a host computing system specific reference;
replacing the host computing system specific reference with a generic reference;
creating a baseline template of the software application including the generic reference, wherein the baseline template may be used to automatically restore multiple instances of the software application to a baseline state via a restoration tool that includes a file transfer function, an unpacking function for expanding the baseline template, and a referencing function for inserting a specific reference into the software application;
uploading the baseline template to a user computer system along with any required scripting routines by utilizing the file transfer function; and
replacing the generic reference with a user computer system specific reference.

2. The method of claim 1, wherein the software application includes at least one of a patch, fix, modification, and customization for the software application.

3. The method of claim 1, wherein the replacing the host computing system specific reference with a generic reference is performed by executing one or more scripting routines.

4. The method of claim 1, wherein creating the baseline template of the software application includes creating one or more backup files.

5. The method of claim 4, wherein the one or more backup files are organized according to a function in the software application.

6. The method of claim 1, wherein the file having a host computing system specific reference is a custom file that is specific to the host computing system.

7. The method of claim 1, further including:
verifying that the installed software application is working properly.

8. A system comprising a processor and a memory communicatively coupled with the processor, the system configured to:
monitor a software application utilized by a plurality of users to identify a specific reference including a name of a host computing system;
install the software application on a host computing system, wherein the installation produces a file having the specific reference that is a host computing system specific reference specific reference;
replace the host computing system specific reference with a generic reference;
create a baseline template of the software application including the generic reference, wherein the baseline template may be used to automatically restore multiple instances of the software application to a baseline state via a restoration tool that includes a file transfer function, an unpacking function for expanding the baseline template, and a referencing function for inserting a specific reference into the software application;
upload the baseline template to a user computer system along with any required scripting routines by utilizing the file transfer function; and
replace the generic reference with a user computer system specific reference.

9. The system of claim 8, wherein the software application includes at least one of a patch, fix, modification, and customization for the software application.

10. The system of claim 8, wherein the host computing system specific reference is replaced with a generic reference by executing one or more scripting routines.

11. The system of claim 8, wherein the baseline template of the software application includes one or more backup files.

12. The system of claim 11, wherein the one or more backup files are organized according to a function in the software application.

13. The system of claim 8, wherein the file having a host computing system specific reference is a custom file that is specific to the host computing system.

14. A non-transitory computer-readable storage medium having, stored thereon, computer-executable instructions being executable by a processor to:
monitor a software application utilized by a plurality of users to identify a specific reference including a name of a host computing system;
install the software application on a host computing system, wherein the installation produces a file having the specific reference that is a host computing system specific reference specific reference;

replace the host computing system specific reference with a generic reference;

create a baseline template of the software application including the generic reference, wherein the baseline template may be used to automatically restore multiple instances of the software application to a baseline state via a restoration tool that includes a file transfer function, an unpacking function for expanding the baseline template, and a referencing function for inserting a specific reference into the software application;

upload the baseline template to a user computer system along with any required scripting routines by utilizing the file transfer function; and replace the generic reference with a user computer system specific reference.

15. The computer-readable storage medium of claim 14, wherein the software application includes at least one of a patch, fix, modification, and customization for the software application.

16. The computer-readable storage medium of claim 14, wherein the host computing system specific reference is replaced with a generic reference by executing one or more scripting routines.

17. The computer-readable storage medium of claim 14, wherein the baseline template of the software application includes one or more backup files.

18. The computer-readable storage medium of claim 17, wherein the one or more backup files are organized according to a function in the software application.

* * * * *